United States Patent
Sasaki et al.

(10) Patent No.: US 8,086,259 B2
(45) Date of Patent: Dec. 27, 2011

(54) RADIO COMMUNICATION APPARATUS, RADIO COMMUNICATION SYSTEM AND RADIO COMMUNICATION METHOD

(75) Inventors: Eisaku Sasaki, Tokyo (JP); Kazuhito Souma, Tokyo (JP)

(73) Assignees: NEC Corporation, Tokyo (JP); NEC Engineering Ltd., Tokyo (JP)

( * ) Notice: Subject to any disclaimer, the term of this patent is extended or adjusted under 35 U.S.C. 154(b) by 356 days.

(21) Appl. No.: 12/227,137

(22) PCT Filed: Apr. 18, 2007

(86) PCT No.: PCT/JP2007/058406
§ 371 (c)(1),
(2), (4) Date: Aug. 11, 2009

(87) PCT Pub. No.: WO2007/138796
PCT Pub. Date: Dec. 6, 2007

(65) Prior Publication Data
US 2009/0305735 A1 Dec. 10, 2009

(30) Foreign Application Priority Data
May 26, 2006 (JP) .................................. 2006-146828

(51) Int. Cl.
*H04B 7/00* (2006.01)

(52) U.S. Cl. .......... 455/522; 455/67.11; 455/68; 455/69

(58) Field of Classification Search .................. 455/522, 455/67.11, 68–70, 115.3, 126, 127.1, 127.2, 455/135, 226.3, 277.2, 296; 370/318
See application file for complete search history.

(56) References Cited

U.S. PATENT DOCUMENTS

| | | | |
|---|---|---|---|
| 5,392,459 A * | 2/1995 | Baba et al. | 455/69 |
| 6,941,113 B2 | 9/2005 | Asano | |
| 7,047,032 B2 | 5/2006 | Yun | |
| 7,587,217 B1 * | 9/2009 | Laakso et al. | 455/522 |
| 2002/0119797 A1 * | 8/2002 | Woodhead et al. | 455/522 |
| 2002/0122460 A1 * | 9/2002 | Lomp | 375/130 |
| 2003/0109278 A1 * | 6/2003 | Cavalli et al. | 455/552 |
| 2003/0176202 A1 * | 9/2003 | Bartl et al. | 455/522 |
| 2004/0097255 A1 * | 5/2004 | Yu | 455/522 |

(Continued)

FOREIGN PATENT DOCUMENTS

JP 57-159148 10/1982
JP 2002-290246 A 10/2002

(Continued)

*Primary Examiner* — Dominic E Rego
(74) *Attorney, Agent, or Firm* — Foley & Lardner LLP

(57) ABSTRACT

A radio communication apparatus includes a control unit for conducting modulation scheme changeover control to change a modulation scheme according to a state of a transmission path and automatic transmitter power control to control a transmission level of another radio communication apparatus to set a reception level of a reception signal to be received by the own apparatus to a predetermined value, wherein the control unit controls, when a changeover is conducted from a first modulation scheme to a second modulation scheme under the modulation scheme changeover control, to keep the transmission level of another radio communication apparatus at a predetermined value under the automatic transmitter power control and conducts, when resetting is conducted from the second modulation scheme to the first modulation scheme under the modulation scheme changeover control, at least one of transmission level reduction control to stepwise lower by a predetermined value the transmission level kept at the predetermined value under the automatic transmitter power control and reception level confirmation control to confirm a state of the reception level for a fixed period of time.

19 Claims, 5 Drawing Sheets

U.S. PATENT DOCUMENTS

| | | | |
|---|---|---|---|
| 2004/0203986 A1* | 10/2004 | Gagnon | 455/522 |
| 2005/0101251 A1 | 5/2005 | Kondo et al. | |
| 2005/0261018 A1* | 11/2005 | Yamamoto | 455/522 |
| 2006/0045117 A1* | 3/2006 | Qi et al. | 370/445 |
| 2008/0248769 A1 | 10/2008 | Kondo et al. | |
| 2009/0270025 A1* | 10/2009 | Kossi et al. | 455/3.01 |
| 2010/0150207 A1* | 6/2010 | Lomp | 375/130 |

FOREIGN PATENT DOCUMENTS

| | | |
|---|---|---|
| JP | 2003-324385 A | 11/2003 |
| JP | 2005-086596 A | 3/2005 |
| JP | 2005-136773 A | 5/2005 |
| JP | 2005-236709 A | 9/2005 |
| JP | 2006-041959 A | 2/2006 |

* cited by examiner

RADIO COMMUNICATION APPARATUS, RADIO COMMUNICATION SYSTEM AND RADIO COMMUNICATION METHOD

This application is the National Phase of PCT/JP2007/058406, filed Apr. 18, 2007, which claims priority to Japanese Application No. 2006-146828, filed May 26, 2006, the disclosures of which are hereby incorporated by reference in their entirety.

TECHNICAL FIELD

The present invention relates to a radio communication system, a radio communication apparatus, and a radio communication method which use a continuous signal transmission scheme, and in particular, to a radio communication apparatus, a radio communication system, and a radio communication method to which an adaptive modulation scheme and automatic transmitter power control are applied.

RELATED ART

Conventionally, since a signal transmission quality of a radio communication system depends on a state of a transmission path, an ordinary reception level is higher than a level to secure the lowest quality. Hence, in an ordinary state, a higher multi-level modulation scheme is applicable and a transmission capacity can be increased. On the other hand, even in an unfavorable transmission path state, a short break of a signal can be avoided by use of a low multi-level modulation scheme. That is, by changing the modulation scheme according to the transmission path state, the maximization of the transmission capacity and the securing of the lowest transmission capacity can be achieved (adaptive modulation scheme). As a conventional technique example of the adaptive modulation scheme, patent document 1 will be cited.

In a radio communication apparatus employing the adaptive modulation scheme, if the transmission path state is favorable and a sufficiently high reception level can be secured as in fine weather, a multi-level modulation scheme having higher frequency utilization efficiency is employed; on the other hand, if the transmission path state is not favorable and the transmission signal quality is deteriorated when the multi-level modulation scheme is used as in rainy weather, the scheme is changed over to a modulation scheme having higher system gain. As a result, regardless of the transmission path state, while securing the signal transmission with higher priority, the transmission capacity can be increased in the ordinary state. At present, for the wireless communication apparatus as an infrastructure of the mobile communication system, it is required to increase the transmission capacity; and as one of the implementing methods, the adaptive modulation scheme is increasing importance.

On the other hand, in the conventional radio communication system, an Automatic Transmitter Power Control (ATPC) are employed as a technique to reduce a degree of interference to other communication lines by lowering the transmission level in the ordinary state. When the ATPC is used, the transmission level is heightened only when the reception level is decreased due to, for example, rainy weather. As a conventional technique example of the ATPC, patent document 2 will be cited.

Patent Document 1: Japanese Patent Laid-Open Publication No. 57-159148
Patent Document 2: Japanese Patent Laid-Open Publication No. 2005-236709

DISCLOSURE OF THE INVENTION

Problem to be Solved by the Invention

However, conventionally, the adaptive modulation scheme is applied to a burst transmission scheme for discontinuous signal transmission. The transmission level in the operation is fixed for each modulation scheme for each burst.

For example, in a situation that the conventional adaptive modulation scheme as that of patent document 1 is applied to a radio communication system for continuous signal transmission, not burst transmission, if the level at resetting to the multi-level modulation scheme is too low, there likely occurs a short break; contrarily, if the level is too high, it is likely that the degree of interference becomes too high. Description will next be given in detail of the operation by referring to FIG. 1.

FIG. 1 shows an example of changes in time of the reception level and the modulation scheme in a radio communication system. It is assumed that two modulation schemes, i.e., QPSK and 32QAM are employed. In FIG. 1, the ordinate represents the reception level (−R2 dBm is a predetermined threshold value to change the modulation scheme, −R3 dBm is a value at which a short break occurs in the 32QAM, and −R4 dBm is a value at which a short break occurs in the QPSK) and the abscissa represents time.

In FIG. 1, for example, when fine weather changes to rainy weather and it begins slightly raining, the reception level lowers to reach point (1) which is a changeover threshold value of the modulation scheme; the modulation scheme is changed from the 32QAM having high frequency utilization efficiency to the QPSK with a low required C/N (i.e., lowering multi-level). At the same time, the transmission level is heightened by a dB. This is because since the 32QAM is strongly influenced by distortion of a transmission amplifier, this can be used only when the transmission level is lowered; however, the QPSK is resistive against the distortion, so that the transmission quality is not lowered even if the amplifier power is increased to a certain extent.

Moreover, in FIG. 1, for example, when the amount of rainfall increases in the rainy weather and the reception level is further reduced to the lowest value at point (2), since the level is not reached to −R4 dBm at which a short break occurs in the QPSK, the short break can be avoided. This is because the transmission level difference is increased at point (1) as well as the reception characteristic is improved to −R4 dBm by the QPSK with a low required C/N.

Furthermore, after point (2) in FIG. 1, when, for example, the rainy weather is changed to fine weather (or cloudy weather), the reception level begins growing to reach point (3) of −R1 dBm, the modulation scheme is immediately reset from the QPSK to the 32QAM (i.e., increasing multi-level). At the same time, the transmission level is reduced by a dB. However, in this situation, since the transmission level is reduced by the transmission level difference, i.e., a dB and the reception characteristic changes from −R4 dBm to −R3 dBm, the system gain lowers. Therefore, when the weather abruptly changes, it is likely that a sufficient reception level is not secured for the 32QAM. Hence, at the moment when the modulation scheme is reset at point (3), the demodulator cannot be connected in the 32QAM and a state of interruption of communication continues; this results in a problem of occurrence of a state in which a signal for which the communication is to be secured is interrupted.

On the other hand, in a radio communication system to which the ATPC is only applied, although the degree of interference can be optimized, the transmission capacity is fixed, and the transmission capacity is determined by the demodulation scheme in consideration of deterioration of the transmission path state.

Therefore, a method of controlling the transmission signal level at a changeover between modulation schemes for a radio communication system which uses the continuous signal transmission scheme, not the burst transmission scheme, and to which the adaptive modulation scheme is applied and the ATPC is applied has not been fully discussed at present.

An exemplary object of the present invention, devised in consideration of the problem above is to provide a radio communication apparatus, a radio communication system, and a radio communication method in which by appropriately controlling the ATPC and the adaptive modulation scheme, a probability of the short break of a signal having high priority can be lowered while reducing the degree of interference in the ordinary state.

Means for Solving the Problem

An exemplary aspect of the present invention is a radio communication apparatus for conducting radio communication with another radio communication apparatus by transmission of continuous signals, including control means for conducting modulation scheme changeover control to change a modulation scheme according to a state of a transmission path and automatic transmitter power control to control a transmission level of another radio communication apparatus to set a reception level of a reception signal to be received by the own apparatus to a predetermined value, wherein the control means controls, in a situation in which a changeover is conducted from a first modulation scheme to a second modulation scheme under the modulation scheme changeover control, to keep the transmission level of another radio communication apparatus at a predetermined value under the automatic transmitter power control and conducts, in a situation in which resetting is conducted from the second modulation scheme to the first modulation scheme under the modulation scheme changeover control, before the resetting at least one of transmission level reduction control to stepwise lower by a predetermined value the transmission level kept at the predetermined value under the automatic transmitter power control and reception level confirmation control to confirm a state of the reception level for a fixed period of time.

The radio communication apparatus may further include reception level detector means for detecting the reception level, wherein in a situation in which lowering of the reception level is detected by the reception level detector means, the control means may control to increase, until the reception level reaches a preset first threshold value, the transmission level of another radio communication apparatus to a maximum value of an output level of the automatic transmitter power control to keep the transmission level at the maximum value.

Furthermore, in the radio communication apparatus, in a situation wherein, after the reception level is lowered and reaches the first threshold value, lowering of the reception level is again detected by the reception level detector means and the reception level reaches a preset second threshold value, the control means may control to conduct a changeover from the first modulation scheme to the second modulation scheme and to simultaneously increase the transmission level controlled to be kept at the maximum value further by a predetermined value to keep the transmission level at a fixed value.

Furthermore, in the radio communication apparatus, in a situation, wherein after the changeover from the first modulation scheme to the second modulation scheme, rising of the reception level is detected by the reception level detector means and the reception level reaches the first threshold value, the control means may conduct at least one of the transmission level reduction control and the reception level confirmation control.

Furthermore, in the radio communication apparatus, the transmission level reduction control may reduce the transmission level controlled to be kept at the maximum value by the control means, stepwise by a predetermined value down to a predetermined output level, and the control means resets, after reducing the transmission level to the predetermined output level by the transmission level reduction control, the second modulation scheme to the first modulation scheme by the modulation scheme changeover control.

Furthermore, in the radio communication apparatus, the reception level confirmation control may confirm for a fixed period of time that the reception level detected by the reception level detector means exceeds the first threshold value, and the control means resets, after confirming by the reception level confirmation control that the reception level detected by the reception level detector means exceeds the first threshold value for a fixed period of time, the second modulation scheme to the first modulation scheme by the modulation scheme changeover control.

Furthermore, in the radio communication apparatus, the control means may reset, after conducting at least one of the transmission level reduction control and the reception level confirming control, the second modulation scheme to the first modulation scheme by the modulation scheme changeover control and simultaneously may control by the automatic transmitter power control the transmission level of another radio communication apparatus to set the reception level of the reception signal to be received by the own apparatus to a predetermined value.

The radio communication apparatus further may include digital cross connect means capable of setting a signal having high priority.

Furthermore, in the radio communication apparatus, the control means may conduct the modulation scheme changeover control and modulation rate changeover control to change a modulation rate.

An exemplary aspect of the present invention is a radio communication system in which radio communication is conducted between an uplink station and a downlink station through transmission of continuous signals, wherein the uplink station includes modulation scheme changeover means for changing a modulation scheme according to a state of a transmission path, automatic transmitter power control request means for requesting the downlink station to control a transmission level of the downlink station to set a reception level of a reception signal to be received by the own station to a predetermined value, and reception level confirmation means for confirming the reception level for a fixed period of time; the downlink station includes second control means for controlling a transmission level of a transmission signal to be transmitted from the own station based on the request from the automatic transmitter power control request means; the uplink station requests, in a situation in which a changeover is conducted from a first modulation scheme to a second modulation scheme by the modulation scheme changeover means, the downlink station to conduct control to keep the transmission level of the downlink station at a predetermined value by the automatic transmitter power control request means and conducts, in a situation in which resetting is conducted from the second modulation scheme to the first modulation scheme by the modulation scheme changeover means, before the resetting at least one of an operation to request the downlink station to conduct control to stepwise lower by a predetermined value the transmission level controlled to be kept at the predetermined value by the automatic transmitter power control request means and an operation to confirm a state of the reception level for a fixed period of time by the reception level confirmation means; and the downlink station controls, based on the request from the automatic transmitter power control request means, the transmission level of the transmission signal to be transmitted from the own station by the automatic transmitter power control means.

Furthermore, in the radio communication system, the uplink station may include reception level detector means for detecting the reception level, wherein in a situation in which lowering of the reception level is detected by the reception level detector means, the automatic transmitter power control request means may request the downlink station to conduct control to increase, until the reception level reaches a preset first threshold value, the transmission level of the downlink station to a maximum value of an output level of the automatic transmitter power control to keep the transmission level at the maximum value.

Furthermore, in the radio communication system, the uplink station may request, in a situation wherein, after the reception level is lowered and reaches the first threshold value, lowering of the reception level is again detected by the reception level detector means and the reception level reaches a preset second threshold value, the downlink station to conduct control, by the automatic transmitter power control request means, to conduct a changeover from the first modulation scheme to the second modulation scheme and to simultaneously increase the transmission level controlled to be kept at the maximum value further by a predetermined value to keep the transmission level at a fixed value.

Furthermore, in the radio communication system, the uplink station may conduct, in a situation wherein, after the changeover from the first modulation scheme to the second modulation scheme by the modulation scheme changeover means, rising of the reception level is detected by the reception level detector means and the reception level reaches the first threshold value, at least one of an operation to request the downlink station to conduct control to stepwise lower by a predetermined value the transmission level controlled to be kept at the predetermined value by the automatic transmitter power control request means and an operation to confirm a state of the reception level for a fixed period of time by the reception level confirmation means.

Furthermore, in the radio communication system, the uplink station may request the downlink station to reset, after conducting at least one of the operation to request the downlink station to conduct control to stepwise lower by a predetermined value the transmission level controlled to be kept at the predetermined value by the automatic transmitter power control request means and the operation to confirm a state of the reception level for a fixed period of time by the reception level confirmation means, the second modulation scheme to the first modulation scheme by the modulation scheme changeover means and to simultaneously control by the automatic transmitter power control request means, the transmission level of the transmission signal from the downlink station to set the reception level of the reception signal to be received by the own station to a predetermined value and the downlink station may control, based on the request from the automatic transmitter power control request means, the transmission level of the transmission signal to be transmitted from the own station by the automatic transmitter power control means.

An exemplary aspect of the present invention is a radio communication method of a radio communication apparatus for conducting radio communication with another radio communication apparatus by transmission of continuous signals, wherein the radio communication apparatus includes a function for conducting modulation scheme changeover control to change a modulation scheme according to a state of a transmission path and automatic transmitter power control to control a transmission level of another radio communication apparatus to set a reception level of a reception signal to be received by the own apparatus to a predetermined value, controls, in a situation in which a changeover is conducted from a first modulation scheme to a second modulation scheme under the modulation scheme changeover control, to keep the transmission level of another radio communication apparatus at a predetermined value under the automatic transmitter power control and conducts, in a situation in which resetting is conducted from the second modulation scheme to the first modulation scheme under the modulation scheme changeover control, before the resetting at least one of transmission level reduction control to stepwise lower by a predetermined value the transmission level kept at the predetermined value and reception level confirmation control to confirm a state of the reception level to be received by the own apparatus for a fixed period of time.

Furthermore, in the radio communication method, the radio communication apparatus may include a function for detecting the reception level and, in a situation in which lowering of the reception level is detected, control to increase, until the reception level reaches a preset first threshold value, the transmission level of another radio communication apparatus to a maximum value of an output level of the automatic transmitter power control to keep the transmission level at the maximum value.

The radio communication method may further include, in that in a situation wherein, after the reception level is lowered and reaches the first threshold value, lowering of the reception level is again detected and the reception level reaches a preset second threshold value, a step for controlling to conduct a changeover from the first modulation scheme to the second modulation scheme and to simultaneously increase the transmission level controlled to be kept at the maximum value further by a predetermined value to keep the transmission level at a fixed value.

The radio communication method may further include, in a situation wherein after the changeover from the first modulation scheme to the second modulation scheme, rising of the reception level is detected and the reception level reaches the first threshold value, a step for conducting at least one of the transmission level reduction control and the reception level confirmation control.

The radio communication method may further include, after conducting at least one of the transmission level reduction control and the reception level confirming control, a step for resetting the second modulation scheme to the first modulation scheme by the modulation scheme changeover control and simultaneously controlling by the automatic transmitter power control the transmission level of another radio communication apparatus to set the reception level of the reception signal to be received by the own apparatus to a predetermined value.

Advantage of the Invention

In accordance with the present invention, by appropriately controlling the ATPC and the adaptive modulation scheme, a sufficient reception level is secured at resetting of the modulation scheme; hence, there can be implemented a radio communication apparatus, a radio communication system, and a radio communication method capable of lowering a probability of signal interruption due to the resetting.

BEST MODE FOR CARRYING OUT THE INVENTION

Next, referring to accompanying drawings, description will be given in detail of a best mode for carrying out the present invention.

Exemplary Embodiment 1

Description will be given of a radio communication system as an exemplary embodiment of the present invention.

The radio communication system of the exemplary embodiment is a radio communication system to transmit a signal with a continuous waveform characterized in that the system employs an adaptive modulation scheme to change the modulation scheme according to the transmission path state; and in the system, by conducting the ATPC, if the transmission path state is deteriorated, a changeover is rapidly conducted to a modulation scheme of a high system gain to avoid a short break of a signal of high priority; and if the transmission path is restored, an algorithm highly secured for a changeover to a modulation scheme with a larger transmission capacity is applied to reduce a probability of a short break associated with the resetting of the modulation scheme.

The radio communication system of the exemplary embodiment includes, as shown in FIG. 2, an uplink station (radio communication apparatus) 1 and a downlink station (radio communication apparatus) 2. The uplink station (radio communication apparatus) 1 and the downlink station (radio communication apparatus) 2 are apparatuses to which the continuous signal transmission, the adaptive modulation scheme, and the ATPC are applied. The uplink station 1 includes an MOD1 as modulator means, a TX1 as transmitter means, an MOD CONT1 as control means for controlling the adaptive modulation scheme and the ATPC, an RSL MON1 as reception level detector means to monitor a reception level to detect a predetermined reception level, a DEM1 as demodulator means, and an RX1 as receiver means. Similarly, the downlink station 2 includes, an MOD2, a TX2, an MOD CONT2, an RSL MON2, a DEM2, and an RX2.

The uplink station 1 modulates an inputted digital signal using a modulation scheme designated by the MOD1 and forwards the modulated signal via the TX1 toward the downlink station 2. Also, the downlink station 2 modulates an inputted digital signal using a modulation scheme designated by the MOD2 and forwards the modulated signal via the TX2 toward the uplink station 1. The MOD1 and the MOD2 correspond to a plurality of modulation schemes, and if the modulation rate is fixed, the transmission capacity is increased as the higher multi-level modulation scheme is used.

Referring now to FIGS. 2 and 3, description will be given of a basic processing operation (modulation scheme changeover control and the ATPC) of the radio communication system of the exemplary embodiment. Incidentally, the operation described below is applied to description of FIG. 3 later.

As FIG. 3 shows, the RSL MON1 of the uplink station 1 shown in FIG. 2 monitors the reception level (step S1) to detect that the reception level being monitored is less than (or more than) a threshold value to conduct modulation scheme changeover control due to a change in weather or the like (step S2). The RSL MON1 includes an Automatic Gain Control (AGC) function and can monitor the reception level using the control value thereof. Also, for the modulation scheme changeover threshold value, a predetermined value is assumed to be set for each modulation scheme.

Thereafter, if the reception level reaches the predetermined modulation scheme changeover threshold value (yes in step S2), the RSL MON1 transmits detected information (1) indicating that the reception level reaches the predetermined modulation scheme changeover threshold value to the MOD CONT1 (step S3). In step S2, if the reception level does not reach the predetermined modulation scheme changeover threshold value (no in step S2), the RSL MON1 continues monitoring the reception level (step S1).

The MOD CONT1 having received the detected information (1) from the RSL MON1 transmits to the MOD1 by use of a free throttle on the radio frame, request information (2) requesting a modulation scheme change (to change (over) the current modulation scheme to another modulation scheme) and designation of a transmission level (to set the transmission level to a predetermined value to heighten or to lower the level; step S4). The MOD1 sets the contents of the request information (2) as part of modulation signal (3) to transmit the resultant signal via the TX1 to the downlink station 2 (step S5).

Incidentally, the detected information (1) includes reception level information indicating the reception level detected by the RSL MON1; the MOD CONT1 designates a transmission level on the basis of the reception level information to conduct ATPC to control the transmission level. According to the ATPC, the transmission level is lowered if a sufficiently high reception level is sustainable to suppress a degree of interference to other communication lines. If the reception level lowers, the transmission level is heightened to keep a transmission quality.

The downlink station 2 receives the modulation signal (3) via the RX2 from the uplink station 1 (step S6), extracts the contents of the request information (2) from the modulation signal (3) by DEM2, and sets the extracted request information as part of a demodulation signal (4) to send the resultant signal to the MOD CONT2 (step S7).

On the basis of the demodulation signal (4) received from the DEM2, the MOD CONT2 sends a control signal (5) to the MOD2 and the TX2 (step S8) to control the MOD2 and the TX2 according to the request from the uplink station 1 (step S9). After the control, the MOD2 sets, as part of a modulation signal (6), response information indicating that the control is achieved as requested by the request information (2) and then transmits the resultant signal via the TX2 to the uplink station 1 (step S10).

The uplink station 1 receives modulation signal (6) via the RX1 from the TX2 of the downlink station 2 (step S11), extracts the response information from the modulation signal (6) by DEM1, and sets the extracted response information as part of a demodulation signal (7) to transmit the resultant signal to the MOD CONT1 (step S12).

The MOD CONT1 having received the demodulation signal (7) from the DEM1 sends a control signal (8) to the MOD1 and the TX1 of the own station (step S13) to control the MOD1 and the TX1, which is similar to the control in the downlink station 2 (step S14). Thereafter, the steps S1 to S14 are repeatedly executed.

FIG. 4 is a diagram showing an example of changes in time of the transmission level, the reception level, and the modulation scheme in the radio communication system of the exemplary embodiment. Assume that the radio communication system of the exemplary embodiment employs two modulation schemes as in FIG. 1, i.e., the 32QAM (a first modulation scheme) and the QPSK (a second modulation scheme). Incidentally, in FIG. 4, the ordinate represents the reception level in the upper section and the transmission level in the lower section and the abscissa represents time. Next, referring to FIG. 4, description will be given of a radio communication method in the radio communication system of the exemplary embodiment.

In the radio communication system of the exemplary embodiment, to keep a bandwidth to be used fixed, the two modulation schemes employ one and the same modulation rate. Assuming that the transmission rate in the QPSK is one, that in the 32QAM is 2.5. That is, the transmission capacity changes by a modulation scheme changeover.

Moreover, according to the radio communication system of the exemplary embodiment, in FIG. 4, an input signal to the radio communication apparatus includes a plurality of signals having capacity less than the transmission capacity of the apparatus; these signals are multiplexed in the apparatus to be collectively modulated. Of the apparatus input signals, those having high priority are to be transmitted even if the modulation scheme is set to the QPSK. The signals which are transmitted only in the 32QAM have low priority.

First, as shown in FIG. 4, in a situation wherein it begins slightly raining in fine weather and the weather changes to rainy weather, the reception level starts lowering. The reception level slightly lowers in the slight rain and considerably lowers as the amount of rainfall becomes greater. During period (A) in which the reception level reaches −R1 dBm which is a threshold value for the ATPC (ATPC threshold value; first threshold value), the ATPC operation is carried out to heighten the transmission level. As a result, the reception level is kept fixed at −R1 dBm. Incidentally, it is assumed that the ATPC threshold value is set to a predetermined value.

Thereafter, at point (1), as the transmission level is increased up to +T1 dBm which is the maximum value of the ATPC output level (ATPC max), the transmission level is kept fixed at +T1 dBm during period (B).

However, since the modulation scheme between periods (A) and (B) is the 32QAM, even when the transmission level is maximized through the ATPC operation, the reception level is lowered during period (B) and a short break takes place if the reception level reaches −R3 dBm. Hence, during period (B), if the reception level is lowered to the predetermined modulation scheme changeover threshold value −R2 dBm and a Bit Error Rate (BER) of the 32QAM is likely to be deteriorated, the modulation scheme is immediately altered to the QPSK at point (2). In this situation, since the QPSK is smaller than the 32QAM in the BER deterioration due to nonlinear distortion, the transmission level can be heightened. Assuming that the level difference is a dB, the transmission level and the reception level discontinuously change at point (2). This a dB corresponds to the maximum transmission level difference restricted by the transmission spectral mask rule for each of the 32QAM and the QPSK. Incidentally, assume that the reception signal is allowed to be once out of synchronization at changeover of the modulation scheme and at heightening of the transmission level difference a dB. Although disconnected, the communication in the QPSK is restored in quite a short period of time. In this regard, in association with the change to the QPSK, the ATPC is changed to a Manual Transmitter Power Control (MTPC).

By conducting control as above, for example, even if the amount of rainfall is increased during period (C) after point (2) and the reception level is further reduced to the minimum value at point (3), since the level does not reach −R4 dBm at which a short break occurs in the QPSK, the short break can be avoided. Incidentally, during period (C) for the transmission in the QPSK, the ATPC operation is stopped and the transmission level is fixed to +T1+αdBm.

After point (3), when the weather again changes from, for example, rainy weather to fine weather (cloudy weather) and the reception level starts rising to reach the ATPC threshold value −R1 dBm at point (4), transmission level reduction control is carried out during period (D). The transmission level reduction control operates as follows. When the RSL MON of the radio communication apparatus detects that the reception level reaches −R1 dBm, the MOD CONT conducts control to lower the transmission level by δ dB. When the RSL MON detects that the reception level rises again to reach −R1 dBm, the MOD CONT again conducts control to lower the transmission level by δ dB. This operation is repeatedly carried out until the transmission level reaches ε dB corresponding to the system gain difference between the QPSK and the 32QAM. Therefore, during period (D) of FIG. 3, by stepwise lowering the transmission level, the system gain equivalent value of the 32QAM can be beforehand confirmed in the QPSK through the transmission level reduction control before the modulation scheme change control to the 32QAM; it is hence possible to avoid the short break at level reduction described by referring to FIG. 1.

Naturally, if the reception level lowers down to the second threshold value (−R2 dBm) during the transmission level reduction control, the system conducts operation to heighten the transmission level to secure the quality.

At point (5), when the transmission level is lowered down to ε dB (ε=α+(R4−R3), α<ε), the transmission level reduction control is stopped at point (6) and reception level confirmation control is started during period (E). The reception level confirmation control is operation to monitor a change in weather further for a fixed period of time when the transmission level is intentionally and stepwise lowered in the QPSK to the lowest value (ε dB in FIG. 4) before the scheme is reset to the 32QAM with a lower system gain. The reception level confirmation control is carried out under control of the MOD CONT of the radio communication apparatus. The MOD CONT confirms for a fixed period of time, based on the detected information from the RSL MON, that the reception level rises exceeding a predetermined value, and reserves transmission of the request information including a request to change to the 32QAM.

Thereafter, during a confirmation time of period (E), after confirming that the reception level is not lowered than −R2 dBm, the system restores the modulation scheme from the QPSK to the 32QAM and restarts the demodulation in the 32QAM and the ATPC operation during period (F).

Through the procedure described above, the radio communication system of the exemplary embodiment sets the scheme to the QPSK as quickly as possible when the reception level is lowered, and can conduct operation to secure a fully high reception level even if the scheme is reset to the 32QAM when the reception level rises.

Incidentally, although description has been given of the changeover between the QPSK and the 32QAM in the exemplary embodiment, the combination of modulation schemes is not restricted by this combination. A plurality of modulation schemes may be employed for the change, so that it is also possible to dispose a changeover threshold value for each modulation scheme to achieve the changeover in multiple stages.

Moreover, although the modulation rate is fixed in the description of the exemplary embodiment, there may be employed a configuration in which the modulation late is lowered as compared with that in the ordinary state to reduce the bandwidth. That is, this is because there is obtained an advantage to improve the system gain also by changing the modulation scheme and the modulation rate.

Additionally, the exemplary embodiment is configured to combine control operations with each other in FIG. 4, namely, after the transmission level reduction control is carried out during period (D), the reception level confirmation control is accomplished during period (E); however, there may be used a configuration in which only the transmission level reduction control is conducted or a configuration in which only the reception level confirmation control is conducted. Moreover, even when the transmission level control procedure is simplified by setting end point (5) of the transmission level reduction control to the maximum value of ATPC, i.e., +T1 dBm, there is achieved improvement as compared with the conventional example.

Also, in FIG. 4, it is possible that the modulation scheme changeover threshold value −R2 dBm is set to a value with an offset margin in consideration of the reception level change quantity within a period of time required for the modulation scheme changeover control for the value of short break occurrence −R3 dBm in the 32QAM.

As above, according to the exemplary embodiment, since there is arranged means to beforehand confirm at resetting of the modulation scheme that a sufficient reception level is secured before the resetting, it is possible to lower the probability of the signal interruption due to the resetting.

Also, according to the exemplary embodiment, since there is disposed the ATPC, it is possible to reduce the degree of interference to others in the ordinary state.

Exemplary Embodiment 2

The radio communication system of the exemplary embodiment includes, in addition to the configuration of exemplary embodiment 1 described above, a Digital Cross Connect (DXC) function in, for example, the uplink station 1 as shown in FIG. 5. The DXC 3 arbitrarily changes setting for signals with higher priority and for the other signals; the signals with higher priority may be changed by the DXC 3.

Therefore, according to the exemplary embodiment, since the DXC 3 is arranged, even if a communication line is added after the operation of the apparatus is started, a signal having higher priority can be arbitrarily set according to necessity.

As above, description has been given of exemplary embodiments of the present invention; however, the present invention is not restricted by the exemplary embodiments, but various changes may be made therein without departing from the gist of the present invention.

INDUSTRIAL APPLICABILITY

The present invention is applicable to a technique for a radio communication system of continuous signal transmission employing the adaptive modulation scheme and the ATPC.

DESCRIPTION OF REFERENCE NUMERALS

Figure 1:
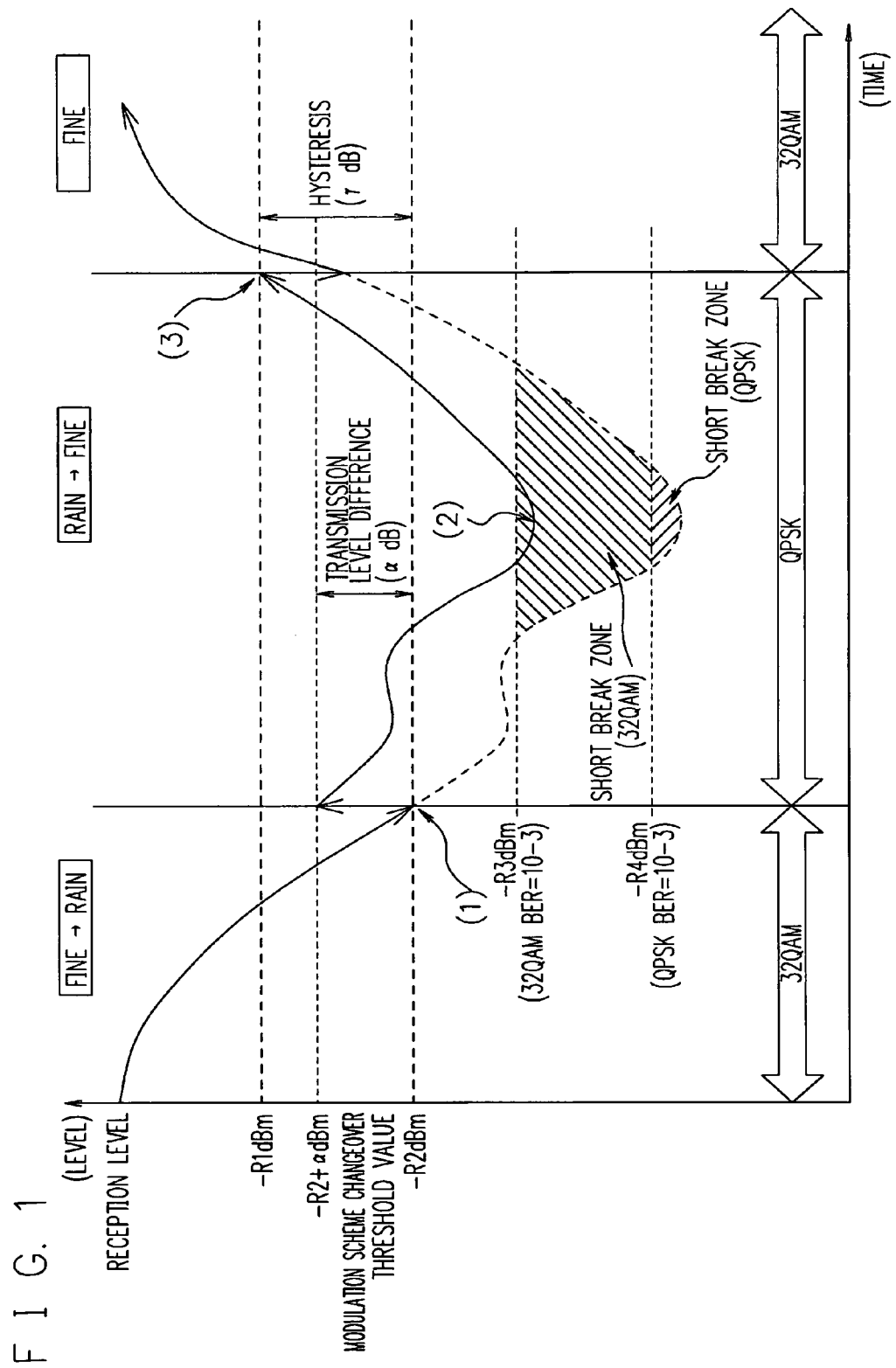
FIG. 1 is a graph showing an example of operation in a radio communication system of the conventional art.
Figure 2:
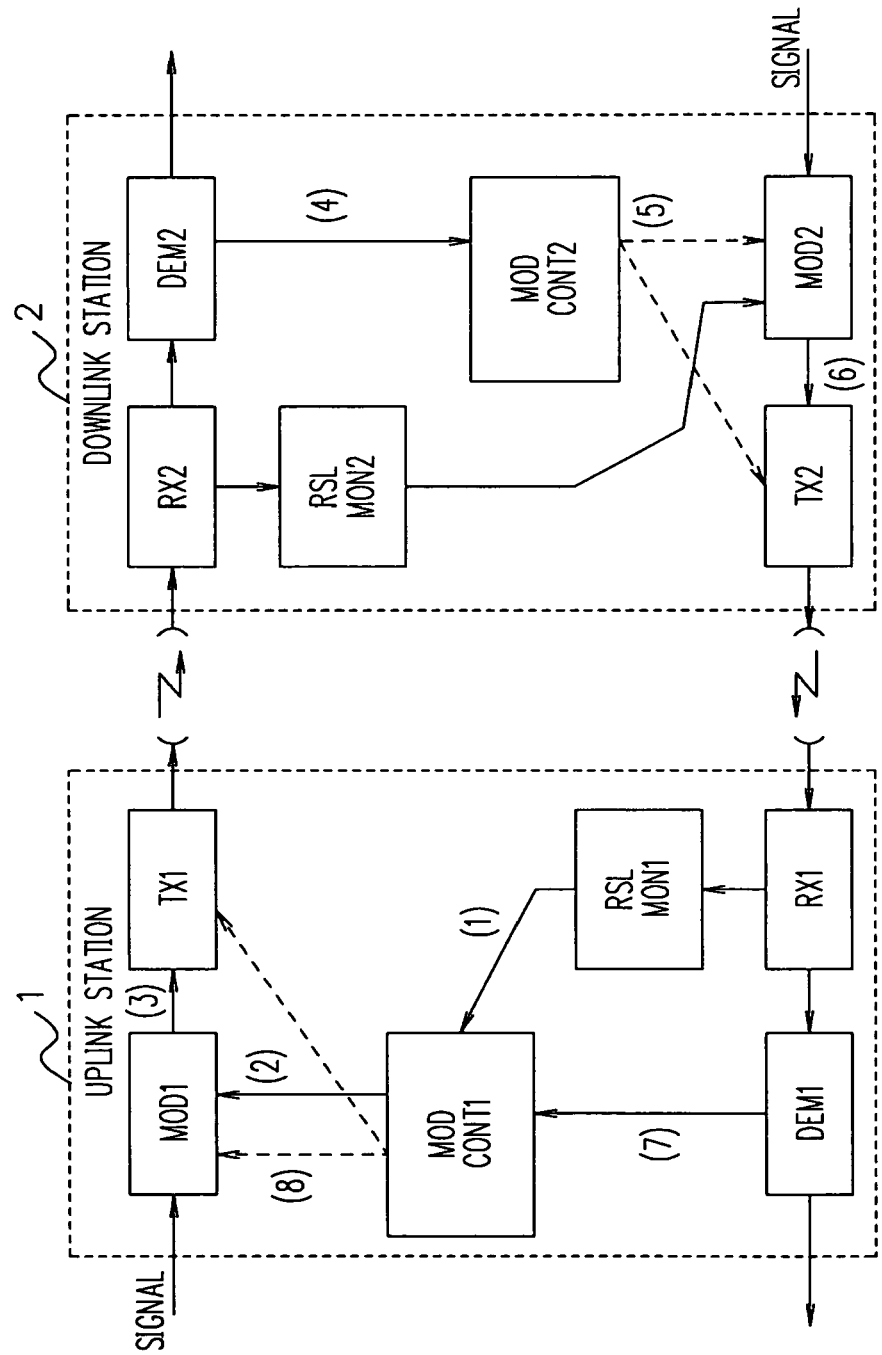
FIG. 2 is a block diagram showing structure of a radio communication system as exemplary embodiment 1 of the present invention.
Figure 3:
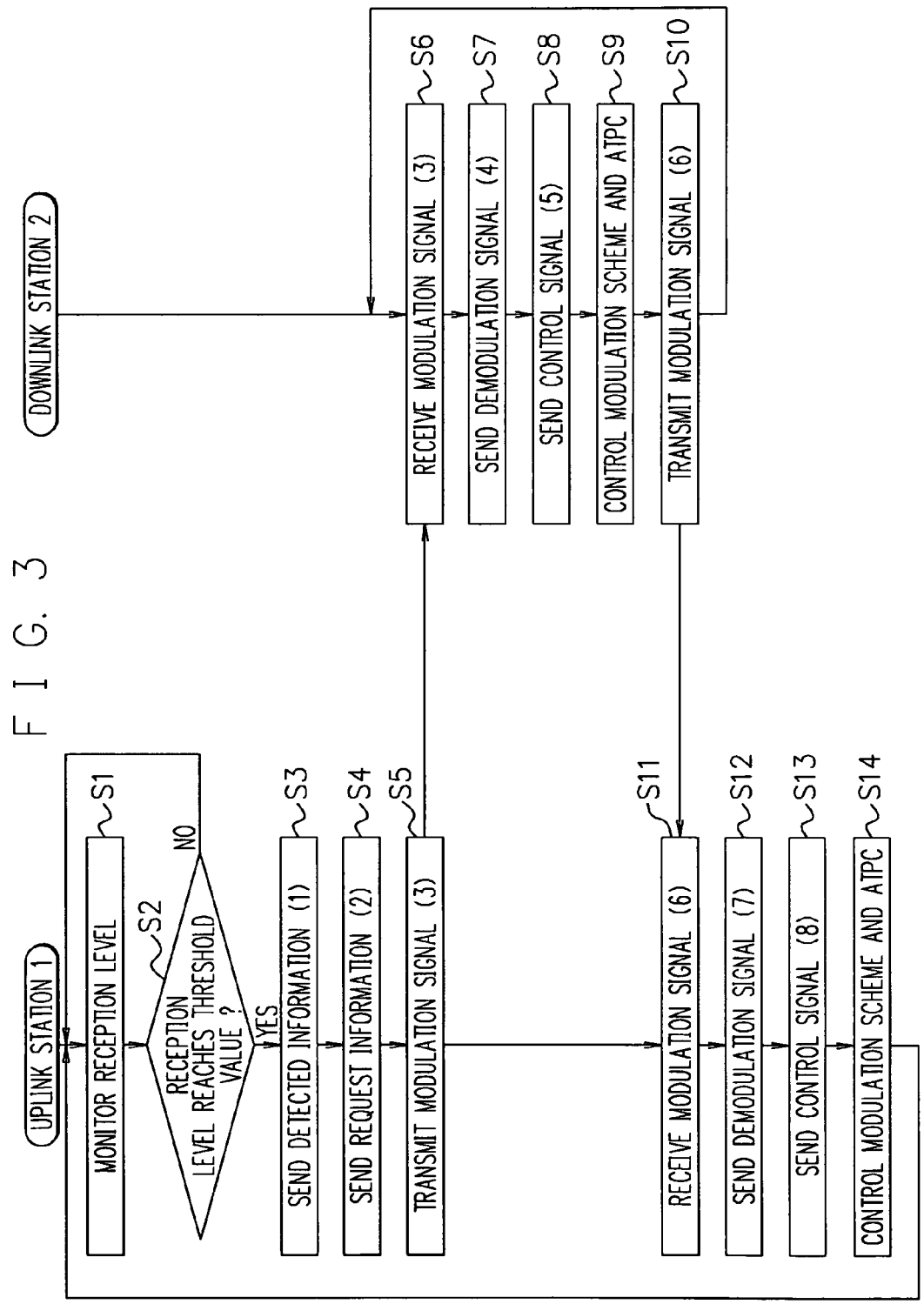
FIG. 3 is a sequence chart showing a basic operation of the radio communication system as exemplary embodiment 1 of the present invention.
Figure 4:
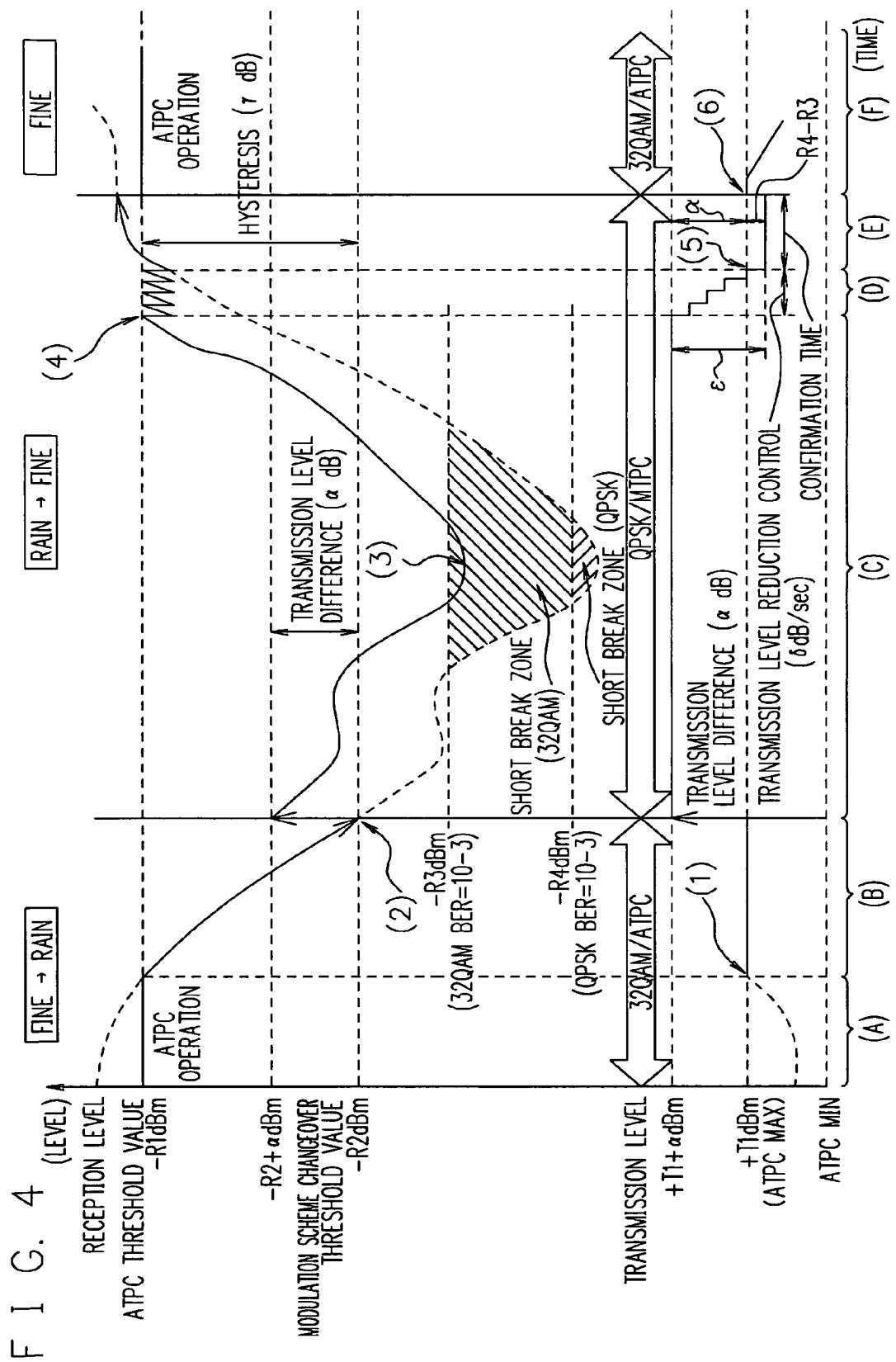
FIG. 4 is a graph showing an example of operation in the radio communication system as exemplary embodiment 1 of the present invention.
Figure 5:
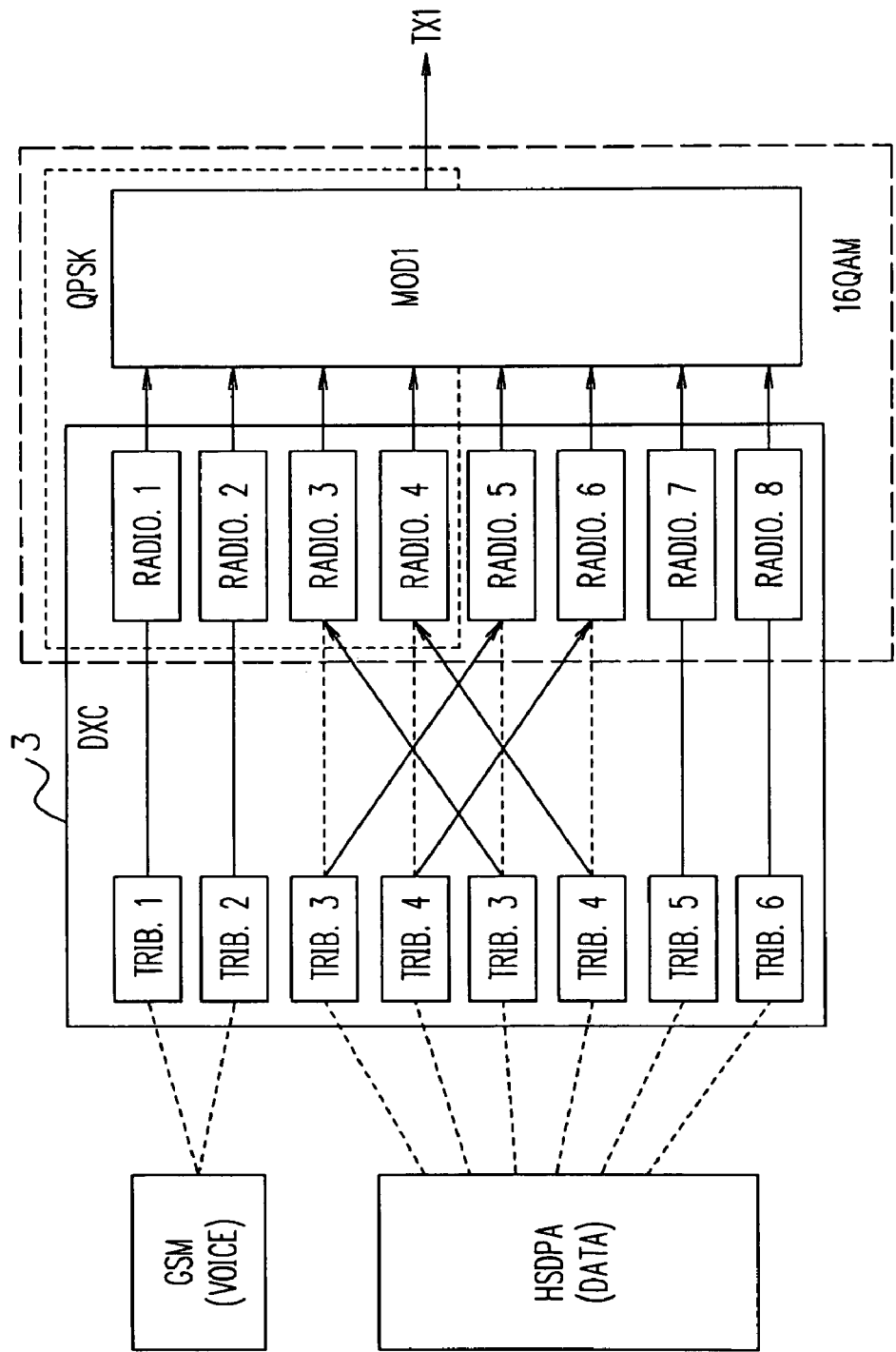
FIG. 5 is a block diagram showing structure of a radio communication system as exemplary embodiment 2 of the present invention.

1 Uplink station (radio communication apparatus)
2 Downlink station (radio communication apparatus)
3 DXC (Digital Cross Connect means)

The invention claimed is:

1. A radio communication apparatus for conducting radio communication with another radio communication apparatus by transmission of continuous signals, comprising:
    a control unit that conducts changeover control to change a modulation scheme according to a state of a transmission path and automatic transmitter power control to control a transmission level of another radio communication apparatus to set a reception level of a reception signal to be received by the own apparatus to a predetermined value, wherein the control unit
    controls, in a situation in which a changeover is conducted from a first modulation scheme to a second modulation scheme under the modulation scheme changeover control, to keep the transmission level of another radio communication apparatus at a predetermined value under the automatic transmitter power control, and
    conducts, in a situation in which resetting is conducted from the second modulation scheme to the first modulation scheme under the modulation scheme changeover control, before the resetting at least one of transmission level reduction control to stepwise lower by a predetermined value the transmission level kept at the predetermined value under the automatic transmitter power control and reception level confirmation control to confirm a state of the reception level for a fixed period of time.

2. The radio communication apparatus in accordance with claim 1, further comprising:
    a reception level detector that detects the reception level, wherein
    in a situation in which lowering of the reception level is detected by the reception level detector, the control unit controls to increase, until the reception level reaches a preset first threshold value, the transmission level of another radio communication apparatus to a maximum value of an output level of the automatic transmitter power control to keep the transmission level at the maximum value.

3. The radio communication apparatus in accordance with claim 2, characterized in that in a situation wherein, after the reception level is lowered and reaches the first threshold value, lowering of the reception level is again detected by the reception level detector and the reception level reaches a preset second threshold value, the control unit controls to conduct a changeover from the first modulation scheme to the second modulation scheme and to simultaneously increase the transmission level controlled to be kept at the maximum value further by a predetermined value to keep the transmission level at a fixed value.

4. The radio communication apparatus in accordance with claim 2, characterized in that in a situation wherein, after the changeover from the first modulation scheme to the second modulation scheme, rising of the reception level is detected by the reception level detector and the reception level reaches the first threshold value, the control unit conducts at least one of the transmission level reduction control and the reception level confirmation control.

5. The radio communication apparatus in accordance with claim 2, wherein the transmission level reduction control reduces the transmission level controlled to be kept at the maximum value by the control unit, stepwise by a predetermined value down, to a predetermined output level, and the control unit resets, after reducing the transmission level to the predetermined output level by the transmission level reduction control, the second modulation scheme to the first modulation scheme by the modulation scheme changeover control.

6. The radio communication apparatus in accordance with claim 2, wherein the reception level confirmation control confirms for a fixed period of time that the reception level detected by the reception level detector exceeds the first threshold value, and the control unit resets, after confirming by the reception level confirmation control that the reception level detected by the reception level detector exceeds the first threshold value for a fixed period of time, the second modulation scheme to the first modulation scheme by the modulation scheme changeover control.

7. The radio communication apparatus in accordance with claim 1, wherein the control unit resets, after conducting at least one of the transmission level reduction control and the reception level confirming control, the second modulation scheme to the first modulation scheme by the modulation scheme changeover control and simultaneously controls by the automatic transmitter power control the transmission level of another radio communication apparatus to set the reception level of the reception signal to be received by the own apparatus to a predetermined value.

8. The radio communication apparatus in accordance with claim 1, further comprising a digital cross connect unit capable of setting a signal having high priority.

9. The radio communication apparatus in accordance with claim 1, wherein the control unit conducts the modulation scheme changeover control and modulation rate changeover control to change a modulation rate.

10. A radio communication system in which radio communication is conducted between an uplink station and a downlink station through transmission of continuous signals, the radio communication system comprising:

the uplink station comprises a modulation scheme changeover unit that changes a modulation scheme according to a state of a transmission path, an automatic transmitter power control request unit that requests the downlink station to control a transmission level of the downlink station to set a reception level of a reception signal to be received by the own station to a predetermined value, and a reception level confirmation unit that confirms the reception level for a fixed period of time;

the downlink station comprises second control unit that controls a transmission level of a transmission signal to be transmitted from the own station based on the request from the automatic transmitter power control request unit;

the uplink station requests, in a situation in which a changeover is conducted from a first modulation scheme to a second modulation scheme by the modulation scheme changeover unit, the downlink station to conduct control to keep the transmission level of the downlink station at a predetermined value by the automatic transmitter power control request unit and conducts, in a situation in which resetting is conducted from the second modulation scheme to the first modulation scheme by the modulation scheme changeover, before the resetting at least one of an operation to request the downlink station to conduct control to stepwise lower by a predetermined value the transmission level controlled to be kept at the predetermined value by the automatic transmitter power control request unit and an operation to confirm a state of the reception level for a fixed period of time by the reception level confirmation; and the downlink station controls, based on the request from the automatic transmitter power control request unit, the transmission level of the transmission signal to be transmitted from the own station by the automatic transmitter power control unit.

11. The radio communication system in accordance with claim 10, wherein the uplink station comprises a reception level detector that detects the reception level, wherein in a situation in which lowering of the reception level is detected by the reception level detector, the automatic transmitter power control request unit requests the downlink station to conduct control to increase, until the reception level reaches a preset first threshold value, the transmission level of the downlink station to a maximum value of an output level of the automatic transmitter power control to keep the transmission level at the maximum value.

12. The radio communication system in accordance with claim 11, wherein the uplink station requests, in a situation wherein, after the reception level is lowered and reaches the first threshold value, lowering of the reception level is again detected by the reception level detector and the reception level reaches a preset second threshold value, the downlink station to conduct control, by the automatic transmitter power control request means unit, to conduct a changeover from the first modulation scheme to the second modulation scheme and to simultaneously increase the transmission level controlled to be kept at the maximum value further by a predetermined value to keep the transmission level at a fixed value.

13. The radio communication system in accordance with claim 11, wherein the uplink station conducts, in a situation wherein, after the changeover from the first modulation scheme to the second modulation scheme by the modulation scheme changeover means unit, rising of the reception level is detected by the reception level detector means and the reception level reaches the first threshold value, at least one of an operation to request the downlink station to conduct control to stepwise lower by a predetermined value the transmission level controlled to be kept at the predetermined value by the automatic transmitter power control request means and an operation to confirm a state of the reception level for a fixed period of time by the reception level confirmation unit.

14. The radio communication system in accordance with claim 10, wherein the uplink station requests the downlink station to reset, after conducting at least one of the operation to request the downlink station to conduct control to stepwise lower by a predetermined value the transmission level controlled to be kept at the predetermined value by the automatic transmitter power control request unit and the operation to confirm a state of the reception level for a fixed period of time by the reception level confirmation unit, the second modulation scheme to the first modulation scheme by the modulation scheme changeover unit and to simultaneously control by the automatic transmitter power control request unit the transmission level of the transmission signal from the downlink station to set the reception level of the reception signal to be received by the own station to a predetermined value and the downlink station controls, based on the request from the automatic transmitter power control request unit, the transmission level of the transmission signal to be transmitted from the own station by the automatic transmitter power control unit.

15. A radio communication method for conducting radio communication with a radio communication apparatus by transmission of continuous signals, the radio communication method comprising:

conducting modulation scheme changeover control to change a modulation scheme according to a state of a transmission path and automatic transmitter power control to control a transmission level of the radio communication apparatus to set a reception level of a reception signal to a predetermined value, controlling, in a situation in which a changeover is conducted from a first modulation scheme to a second modulation scheme under the modulation scheme changeover control, to keep the transmission level of another radio communication apparatus at a predetermined value under the automatic transmitter power control, and conducting, in a situation in which resetting is conducted from the second modulation scheme to the first modulation scheme under the modulation scheme changeover control, before the resetting at least one of transmission level reduction control to stepwise lower by a predetermined value the transmission level kept at the predetermined value and reception level confirmation control to confirm a state of the reception level for a fixed period of time.

16. The radio communication method in accordance with claim 15, further comprising:

detecting the reception level, and controlling, in a situation in which lowering of the reception level is detected, to increase, until the reception level reaches a preset first threshold value, the transmission level of the radio communication apparatus to a maximum value of an output level of the automatic transmitter power control to keep the transmission level at the maximum value.

17. The radio communication method in accordance with claim 16, further comprising, in that in a situation wherein, after the reception level is lowered and reaches the first threshold value, lowering of the reception level is again detected and the reception level reaches a preset second threshold value, a step for controlling to conduct a changeover from the first modulation scheme to the second modulation scheme and to simultaneously increase the transmission level controlled to be kept at the maximum value further by a predetermined value to keep the transmission level at a fixed value.

18. The radio communication method in accordance with claim 16, further comprising, in that in a situation wherein, after the changeover from the first modulation scheme to the second modulation scheme, rising of the reception level is detected and the reception level reaches the first threshold value, a step for conducting at least one of the transmission level reduction control and the reception level confirmation control.

19. The radio communication method in accordance with claim 15, further comprising, in that the method resets, after conducting at least one of the transmission level reduction control and the reception level confirming control, a step for resetting the second modulation scheme to the first modulation scheme by the modulation scheme changeover control and simultaneously controlling by the automatic transmitter power control the transmission level of another radio communication apparatus to set the reception level of the reception signal to be received by the own apparatus to a predetermined value.

* * * * *